US007634066B2

(12) United States Patent  
Quinton

(10) Patent No.: US 7,634,066 B2
(45) Date of Patent: *Dec. 15, 2009

(54) SPEECH PROCESSING FOR TELEPHONY API

(75) Inventor: Mary Michelle Quinton, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1230 days.

This patent is subject to a terminal disclaimer.

(21) Appl. No.: 10/882,703

(22) Filed: Jul. 1, 2004

(65) Prior Publication Data

US 2004/0240629 A1 Dec. 2, 2004

Related U.S. Application Data

(60) Division of application No. 09/557,333, filed on Apr. 24, 2000, now Pat. No. 7,251,315, which is a continuation-in-part of application No. 09/157,469, filed on Sep. 21, 1998, now Pat. No. 6,343,116.

(51) Int. Cl.
H04M 1/64 (2006.01)
G06F 15/00 (2006.01)
(52) U.S. Cl. .................................... 379/88.17; 704/200
(58) Field of Classification Search ............... 379/67.1, 379/88.13–88.18, 355.07; 704/270
See application file for complete search history.

(56) References Cited

U.S. PATENT DOCUMENTS

| 4,391,530 A | 7/1983 | Wakabayashi et al. |
| 4,860,342 A | 8/1989 | Danner |
| 5,127,003 A | 6/1992 | Doll, Jr. et al. |
| 5,473,680 A | 12/1995 | Porter |
| 5,493,603 A | 2/1996 | Hirayama |
| 5,493,608 A | 2/1996 | O'Sullivan |
| 5,572,675 A | 11/1996 | Bergler |
| 5,574,888 A | 11/1996 | Panditji et al. |
| 5,633,916 A | 5/1997 | Goldhagen et al. |
| 5,717,742 A | 2/1998 | Hyde-Thomson et al. |

(Continued)

FOREIGN PATENT DOCUMENTS

JP 6062141 A 3/1994

(Continued)

OTHER PUBLICATIONS

U.S. Appl. No. 11/055,033, filed Feb. 7, 2005, Quinton.

(Continued)

Primary Examiner—Fan Tsang
Assistant Examiner—Mohammad K Islam
(74) Attorney, Agent, or Firm—Perkins Coie LLP

(57) ABSTRACT

Systems, methods, and structures are discussed that enhance media processing. One aspect of the present invention includes a data structure to enhance media processing. The data structure includes a terminal data structure to instantiate terminal objects and a speech recognition terminal data structure that extends the terminal data structure. Another aspect of the present invention includes a data structure to enhance media processing. This data structure includes a terminal data structure to instantiate terminal objects and a speech generation terminal data structure that extends the terminal data structure. These data structures may be used to implement an internet protocol interactive voice response system, an internet protocol unified message system, and speech-enabled Web applications.

33 Claims, 11 Drawing Sheets

U.S. PATENT DOCUMENTS

| | | | |
|---|---|---|---|
| 5,764,639 A | 6/1998 | Staples et al. | |
| 5,799,067 A | 8/1998 | Kikinis et al. | |
| 5,852,719 A | 12/1998 | Fishler et al. | |
| 5,915,001 A | 6/1999 | Uppaluru | |
| 5,943,399 A | 8/1999 | Bannister et al. | |
| 5,946,377 A * | 8/1999 | Wolf | 379/88.22 |
| 5,999,207 A | 12/1999 | Rodriguez et al. | |
| 6,006,253 A | 12/1999 | Kumar et al. | |
| 6,018,571 A | 1/2000 | Langlois et al. | |
| 6,044,347 A | 3/2000 | Abella et al. | |
| 6,094,635 A * | 7/2000 | Scholz et al. | 704/270 |
| 6,097,380 A | 8/2000 | Crites et al. | |
| 6,160,877 A | 12/2000 | Tatchell et al. | |
| 6,173,266 B1 * | 1/2001 | Marx et al. | 704/270 |
| 6,208,724 B1 | 3/2001 | Fritzinger et al. | |
| 6,249,809 B1 | 6/2001 | Bro | |
| 6,256,680 B1 | 7/2001 | Kim | |
| 6,269,254 B1 | 7/2001 | Mathis | |
| 6,269,336 B1 * | 7/2001 | Ladd et al. | 704/270 |
| 6,282,269 B1 | 8/2001 | Bowater et al. | |
| 6,314,402 B1 | 11/2001 | Monaco et al. | |
| 6,337,858 B1 | 1/2002 | Petty et al. | |
| 6,343,116 B1 | 1/2002 | Quinton | |
| 6,445,694 B1 | 9/2002 | Swartz | |
| 6,463,051 B1 | 10/2002 | Ford | |
| 6,515,695 B1 | 2/2003 | Sato et al. | |
| 6,529,863 B1 | 3/2003 | Ball et al. | |
| 6,606,611 B1 | 8/2003 | Khan | |
| 6,618,476 B1 | 9/2003 | Szeto et al. | |
| 6,621,901 B1 | 9/2003 | Gruia et al. | |
| 6,625,258 B1 | 9/2003 | Ram et al. | |
| 6,636,587 B1 | 10/2003 | Nagai et al. | |
| 6,681,001 B1 | 1/2004 | Clayton et al. | |
| 6,687,342 B1 | 2/2004 | Hettish | |
| 6,704,394 B1 | 3/2004 | Kambhatla et al. | |
| 6,741,688 B1 | 5/2004 | Yau | |
| 6,754,313 B1 | 6/2004 | Quinton et al. | |
| 6,757,374 B2 | 6/2004 | Bardehle | |
| 6,778,661 B1 | 8/2004 | Yumoto et al. | |
| 6,804,333 B1 | 10/2004 | Liu et al. | |
| 6,804,339 B1 | 10/2004 | Hettish | |
| 6,829,334 B1 | 12/2004 | Zirngibl et al. | |
| 6,859,776 B1 | 2/2005 | Cohen et al. | |
| 6,888,927 B1 | 5/2005 | Cruickshank et al. | |
| 6,904,485 B1 | 6/2005 | Quinton | |
| 6,999,932 B1 | 2/2006 | Zhou | |
| 2002/0006124 A1 | 1/2002 | Jimenez et al. | |
| 2002/0032806 A1 | 3/2002 | Machin et al. | |
| 2002/0183044 A1 | 12/2002 | Blackwell et al. | |
| 2004/0234051 A1 | 11/2004 | Quinton | |
| 2004/0240630 A1 | 12/2004 | Quinton | |
| 2004/0240636 A1 | 12/2004 | Quinton | |
| 2005/0105697 A1 | 5/2005 | Hollowell et al. | |
| 2005/0193332 A1 | 9/2005 | Dodrill et al. | |

FOREIGN PATENT DOCUMENTS

| | | |
|---|---|---|
| JP | 6062142 | 3/1994 |

OTHER PUBLICATIONS

U.S. Appl. No. 09/557,333, Quinton.
U.S. Appl. No. 09/649,510, Quinton.
"CT Media API Reference—vol. 2 for Windows NT", 261 Pages.
"CT Media API Reference—vol. 1 for Windows NT", 557 Pages.
*CT Media—A Breakthrough in Client/Server Computer Telephony*, 33 pages (Aug. 11, 2000) "http://www.dialogic.com/products/ctmedia/2975web.htm".
*The Source for Java Technology*, Java™ Telephone API Home Page, 6 pages, (Aug. 11, 2000) "http://ww.java.sun/.com/products/jtapi/".
*Java Telephone API Call Center Extension Package*—Revision 1.2, Oct. 1997, Call Center Overview, 14 pages, (Aug. 11, 2000) "http://ww.java.sun/com/products/jtapi/jtapi-1.2/CallCentOverview.html".
*Java Telephony API—Call Control Extension Package*, Oct. 1997, Version 1.2, The Java Telephony API Call Control Package, 14 Pages (Oct. 31, 2003) "http://www.java.sun.com/products/jtapi/jtapi-1.2/CallCtlOverview.html".
*An Introduction to JTAPI (Java Telephony API)* Release 1.2 Rev. 0.7, ECTF Framework White Paper, 21 Pages, (0811/00) "http://www.java.sun.com/products/jtapi/jtapi-1.2/JTAPIWhitePaper-0-7.html".
*Java Telephony API Media Extension Package*—Jan. 28, 1997 Version 1.0, The Java Telephony API Media Package, 10 Pages, (Aug. 11, 2000) http://www.java.sun.com/products/jtapi/jtapi-1.2/MediaOverview.html.
*The Java Telephone API—An Overview*—Oct. 1997, Version 1.2, The Java Telephony API, 22 Pages, (Aug. 11, 2000) "http://www.java.sun.com/products/jtapi/jtapi-1.2/PhoneOverview.html".
*Java Telephony API Phone Extension Package*—Jan. 28, 1997, Version 1.1, The Java Telephony API Phone Package, 5 Pages, (Aug. 11, 2000) "http://www.java.sun.com/products/jtapi/jtapi-1.2/PhoneOverview.html".
*Introduction to Direct Show*, 4 Pages, (Oct. 31, 2003) "http://www.microsoft.com/DirectX/dxm/help/dx/default.htm".
Java Telephony API—"JTAPI", 16 pages.

* cited by examiner

SPEECH PROCESSING FOR TELEPHONY API

This application is a divisional of U.S. patent application Ser. No. 09/557,333 filed Apr. 24, 2000 now U.S. Pat. No. 7,251,315, which is a continuation-in-part of U.S. patent application Ser. No. 09/157,469 filed Sep. 21, 1998 and which resulted in U.S. Pat. No. 6,343,116, issued on Jan. 29, 2002. This application contains subject matter related to pending U.S. patent application Ser. No. 09/649,510 filed Aug. 25, 2000. This application further contains subject matter related to three co-pending U.S. patent applications filed on Jul. 1, 2004.

TECHNICAL FIELD

This invention relates generally to computer telephony, and more particularly to speech processing for computer telephony.

COPYRIGHT NOTICE—PERMISSION

A portion of the disclosure of this patent document contains material, which is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings attached hereto: Copyright ©1999, 2000, Microsoft Corporation, All Rights Reserved.

BACKGROUND

With the advent of computer networking, such as local-area networks (LAN), wide-area networks (WAN), intranets and the Internet, several applications have become popularized. In one such application, a user of a first client computer is able to "call" and communicate with a user of a second client computer. This type of application is generally known as computer telephony.

To accommodate computer telephony, operating systems such as versions of the MICROSOFT WINDOWS operating systems include telephony application programming interfaces, or TAPI'S. (It is noted that TAPI typically refers specifically to Microsoft's Telephony API and is not usually used in reference to other telephony API's. However, as used in this application, TAPI refers to telephony API's generically.) Application programming interfaces (API's) are interfaces by which computer programs can provide for specific functionality that is included within the operating systems. This means that programmers developing such programs do not have to develop their own code to provide this functionality, but rather can rely on the code within the operating system itself. Thus, a TAPI relates to a computer telephony application programming interface.

In the MICROSOFT WINDOWS 95 operating system, as well as other versions of the MICROSOFT WINDOWS operating system, TAPI version 2.1 provides for some basic computer telephony functionality for utilization by computer programs. In particular, TAPI 2.1 provides for call control—the initiation and termination of computer telephony calls. However, call control is only one aspect of computer telephony. For example, once a computer telephony call is placed, the media aspects of the call must also be controlled. However, TAPI 2.1, as well as other prior art telephony API's, do not provide for this functionality.

The media aspects of the call relate to the information (or, media) that is itself the subject of the call. For example, a voice call includes audio information transmitted by both the caller and callee of a call, a video call includes both audio information and visual (video) information, etc. Currently, any multimedia devices that are to be used in conjunction with a computer telephony call—such as microphones to detect sound, and speakers to play sound—must have specific drivers written for this purpose, to be used specifically in conjunction with computer telephony calls. Other multimedia devices that may be present, in other words, may not be usable in conjunction with the call.

TAPI 2.1, as well as other prior art telephony API's, are also represented as a framework that is not easily expanded. For example, TAPI 2.1 is procedurally based, which means the API cannot easily accommodate new aspects and features without redeveloping the entire API. For the reasons outlined in this background, as well as other reasons, there is, therefore, a need for the present invention.

SUMMARY

The above-identified problems, shortcomings and disadvantages with the prior art, as well as other problems, shortcoming and disadvantages, are solved by the present invention, which will be understood by reading and studying the specification and the drawings. In one embodiment, a system includes at least one call control object and at least one media control object. The call control objects are to initiate and terminate a computer telephony call having a media stream. The media control objects are to end-point the media stream of the computer telephony call. In a further embodiment, there is also a media control manager to instantiate a media control object for each multimedia device of the system.

Thus, embodiments of the invention provide for advantages not found in the prior art. The invention provides for well-defined media control: besides call control objects, embodiments of the invention include media control objects to end-point (for example, source or sink) the media stream of a computer telephony call. The invention provides for the utilization of multimedia devices (including virtual devices as well as physical devices) that may not have been installed specifically for telephony purposes, via the media control manager instantiating media control objects for such devices. Furthermore, the invention provides for an object-based hierarchy to TAPI's (e.g., via the call control objects and the media control objects), to maximize flexibility and further expansion of TAPI's based on the invention.

The invention includes systems, methods, computers, application programming interfaces, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

Figure 1:
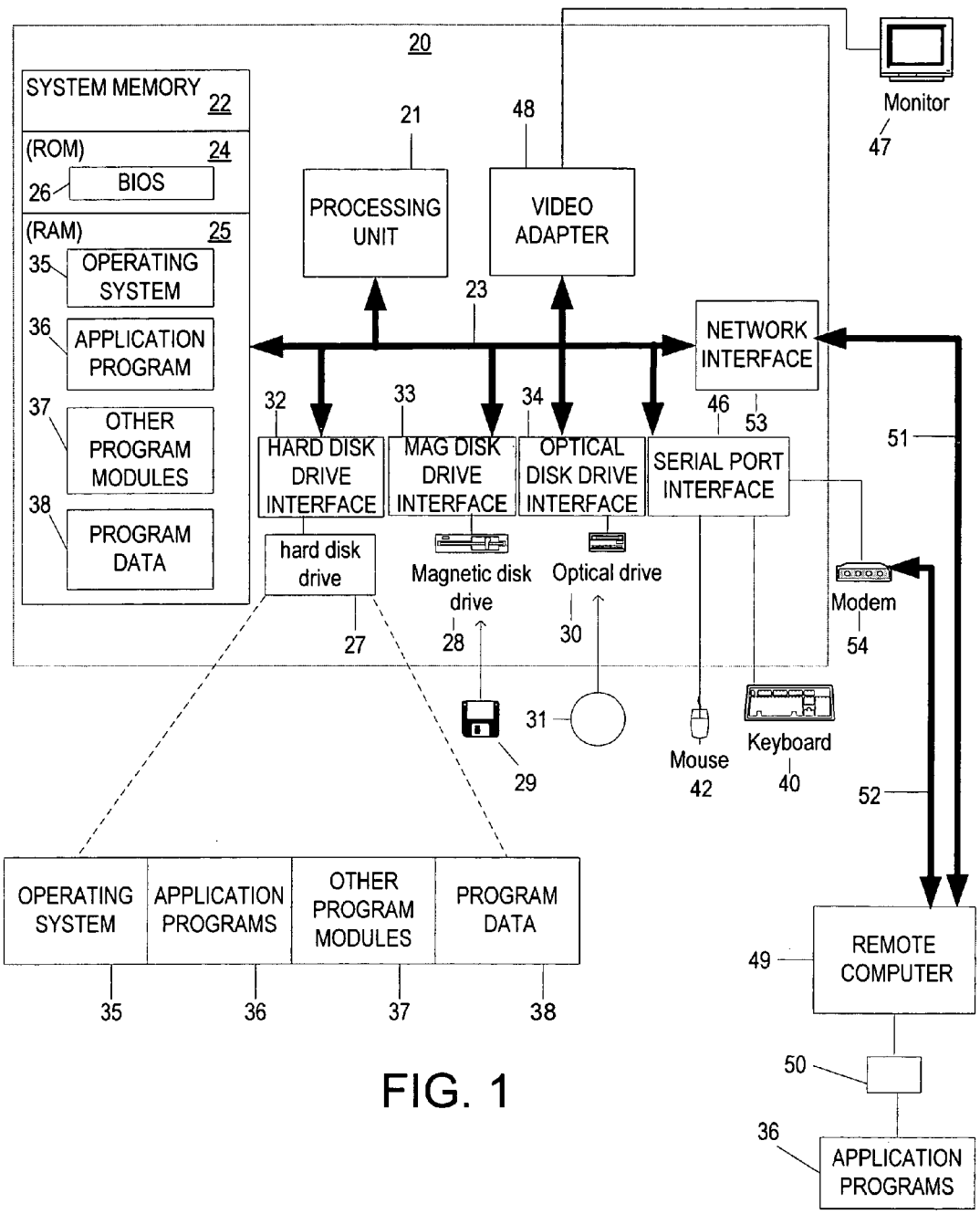
FIG. 1 shows a diagram of the hardware and operating environment in conjunction with which aspects of the invention may be practiced.

In the following detailed description of exemplary embodiments of the invention, reference is made to the accompanying drawings which form a part hereof, and in which is shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

Hardware and Operating Environment

FIG. 1 is a block diagram of a system according to one aspect of the present invention. FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc., that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like, which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules, and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24, and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices such as a sound adapter, speakers, and additional devices such as printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft.RTM. Word which are depicted as residing within PC 20 or portions thereof may be stored in remote storage device 50. Of course, the network connections shown are illustrative, and other means of establishing a communications link between the computers may be substituted.

Software may be designed using many different methods, including object-oriented programming methods. C++ is one example of common object-oriented computer programming languages that provide the functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that acts upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

System

Figure 2:
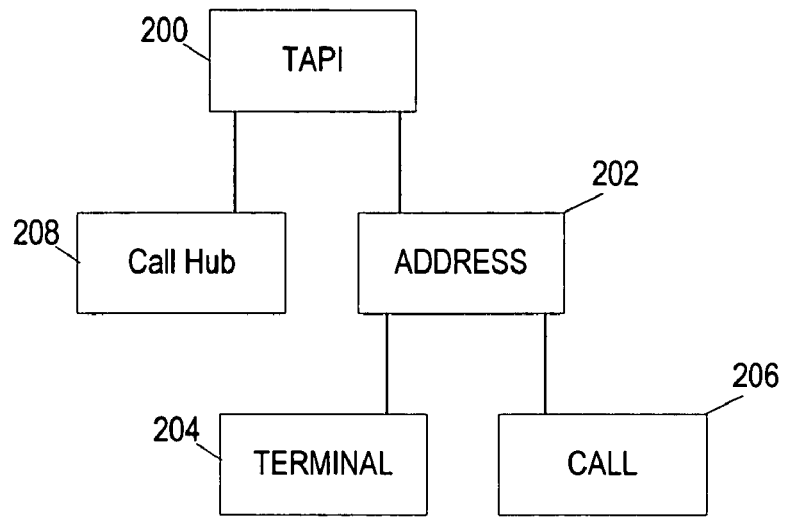
FIG. 2 shows a block diagram of an object hierarchy according to one aspect of the present invention.
Figure 3:
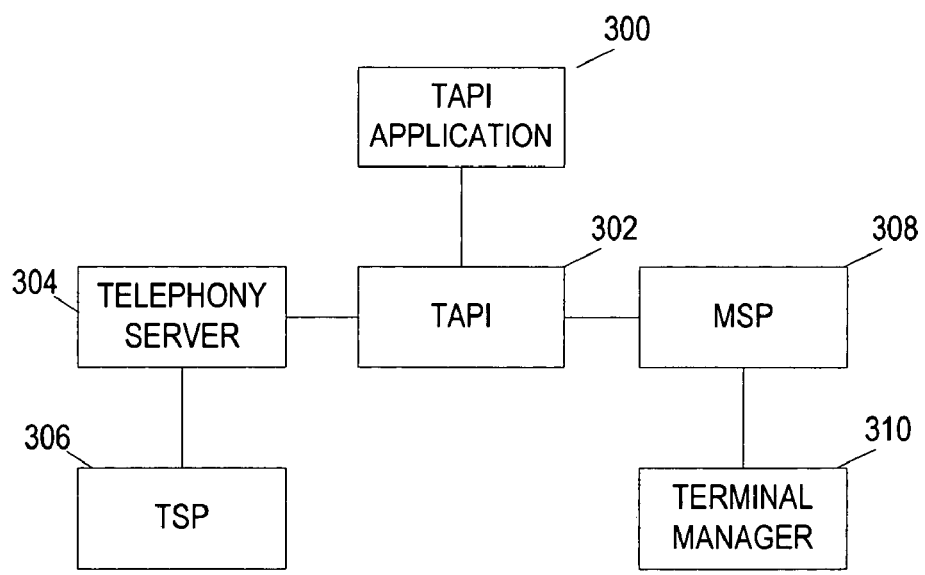
FIG. 3 shows a block diagram of an architecture according to one aspect of the present invention.

FIG. 2 shows a block diagram of an object hierarchy according to one embodiment of the invention. FIG. 3 shows a block diagram of an architecture according to one embodiment of the invention. In this section of the detailed description, a description of a computerized system according to an embodiment of the invention is provided. The description is provided by reference to FIG. 2 and FIG. 3.

Referring first to FIG. 2, an object hierarchy according to an embodiment of the invention is shown. The system includes a telephony application programming interface object (TAPI object) 200, an address object 202, a terminal object 204, a call object 206, and a call-hub object 208. For each of objects 202, 204, 206 and 208, only a single object of each type is shown in FIG. 2 for purposes of clarity; however, there can be in one embodiment of the invention multiple instantiations of each of these objects. Each of the objects 202, 204, 206 and 208 may in one embodiment correspond to a specific means for performing functionality of the object.

The interface object 200 provides an interface by which computer programs can access the functionality provided by these other objects. This means that the computer programs themselves do not have to include code for this functionality, but instead can rely on the functionality provided by the objects themselves as already existing, and as interfaced to such programs via the interface object 200. Application programming interfaces within operating systems such as versions of the MICROSOFT WINDOWS operating system are known within the art.

The address object 202 is a type of first-party call control object. A call control object is an object that provides for the initiation and termination of a computer telephony call having a media stream—that is, the object provides for the connection and ending of a call. In particular, the address object 202 is an object over which a computer telephony call may be placed. That is, the address object 202 represents a line or device that can make or receive calls on it. In different embodiments of the invention, the object represents a modem attached to a PSTN (Public Switching Telephone Network) phone line, an ISDN (Integrated Services Digital Network) hardware card attached to an ISDN line, a DSL (Digital Subscriber Loop) modem attached to a PSTN phone line having DSL capability, and an IP (Internet Protocol) address that is able to make IP telephony calls. However, the invention is not limited to a particular representation. The address object 202 is a first-party call control object in that it relates to a party of the telephony call—for example, the caller or callee of the telephony call—as opposed to a third party not specifically of the telephony call.

The terminal object 204 is a type of media control object. A media control object is an object that end-points the media stream of a computer telephony call. The media stream of a computer telephony call is the information that actually makes up the call—for example, audio information in the case of a voice call, audio and image (video) information in the case of a video call, etc. A media control object end-points the media stream in that it can be a sink object, which is a finishing end point such as speaker or a monitor where the media stream ends or is "sunk" after it has been communicated from one party to the call to another party to the call, or a source object, which is a beginning end point such as a microphone or a speaker where the media stream begins or is "sourced" such that it is then communicated from one party to the call to another party to the call. The terminal object 204 can represent physical devices, such as the microphone or speakers on a sound card, a video camera, and a phone, as well as more dynamic, virtual devices, such as a video window on the screen, a file to which the media stream is saved, and a DTMF (Dual Tone Multiple Frequency) detector.

The call object 206 is another type of first-party call control object. In particular, the call object 206 represents an end-point of the computer telephony call. For example, for a caller to callee direct call, there would be two call objects 206, a first object representing the first end point of the call, and a second object representing the second end point of the call. In a conference call, there would be more than two call objects 206, one object 206 for each participant (end point).

The call-hub object 208 is a third-party call control object. The call-hub object 208 relates the call objects 206 for a particular computer telephony call. In other words, it represents a telephony connection itself, and is basically a collection of call objects that are all related because they are on the same telephony connection. For example, one type of call-hub object 208 is a tracking object in a call center environment, to track the callers on a particular call, the duration of the phone call, etc. A third-party call control object is also able to initiate and terminate a phone call. However, the object is a third-party call control object in that it does not specifically relate to a particular party of the telephony call, but rather may encompass all the parties of the call (as well as information regarding the call).

Referring next to FIG. 3, a block diagram of an architecture according to one embodiment of the invention is shown. The architecture includes a TAPI application 300, the TAPI 302, a telephony server 304, a telephony service provider 306, a media stream provider 308, and a terminal manager 310. The TAPI application 300 is a computer program that utilizes the functionality provided by the TAPI 302. That is, the TAPI application 300 is any type of computer program that utilizes the TAPI 302, through which the application is able to access telephony call control and media control functionality provided by the TAPI 302.

The telephony server 304 and the telephony service provider 306 make up the call control aspects of the architecture of FIG. 3. The telephony server 304 keeps track of all telephony capabilities on a given computerized system; for example, such as that found within versions of the MICROSOFT WINDOWS NT operating system. The telephone service provider 306 is a component used to control a specific piece of telephony hardware. Although only one provider 306 is shown in FIG. 3, the invention is not so limited; there can be many such providers installed.

The media stream provider 308 and the terminal manager 310 make up the media control aspects of the architecture of FIG. 3. The media stream provider 308 is an extension of the provider 306, and works together with the provider 306 to implement call control (via the provider 306) and media control (via the provider 308). All call control requests proceed through the telephony server 304 to the provider 306, and all media control requests proceed through to the provider 308. The media stream provider 308 is a component used to control a specific media stream (such as audio, video, etc.). Furthermore, there is a media stream provider 308 for each different media stream; although only one provider 308 is shown in FIG. 3, the invention is not so limited—there can be many such providers installed.

The terminal manager 310 is a media control manager. It is a component that instantiates a medial control object for each installed multimedia device. That is, it is a component that allows telephony applications (such as application 300) to use any multimedia device installed within a telephony environment. When the manager 310 is initialized, it discovers all multimedia devices that it can use that are installed on a given computer, such as sound cards, video capture cards, as well as other multimedia hardware; the invention is not so limited. The manager than creates a medial control object, such as a terminal object, for each of these devices. The manager 310 also creates terminal objects or media control objects for other media sources or sink that do not necessarily correspond to hardware, but rather to virtual devices. These types of device represent media stream processing that is performed by the computer itself, rather than specific hardware. For example, these types of terminals may include a video window, a speech recognition engine, and a file; the invention is not so limited.

The TAPI 302 in one embodiment has an interface that defines how the provider 308 communicates with the terminal manager 310. This interface allows any provider 308 (there may be more than one provider 308, although for purposes of clarity only one is shown in FIG. 3) to query the manager 310 for the devices that are represented as terminal or media control objects. The interface also allows the provider 308 to determine from the manager 310 how to include these devices within media streams that the provider 308 is to set up. Therefore, the manager 310 allows any provider 308 to access the same set of terminal or media control objects, and use them with any telephony hardware.

Figure 4A:
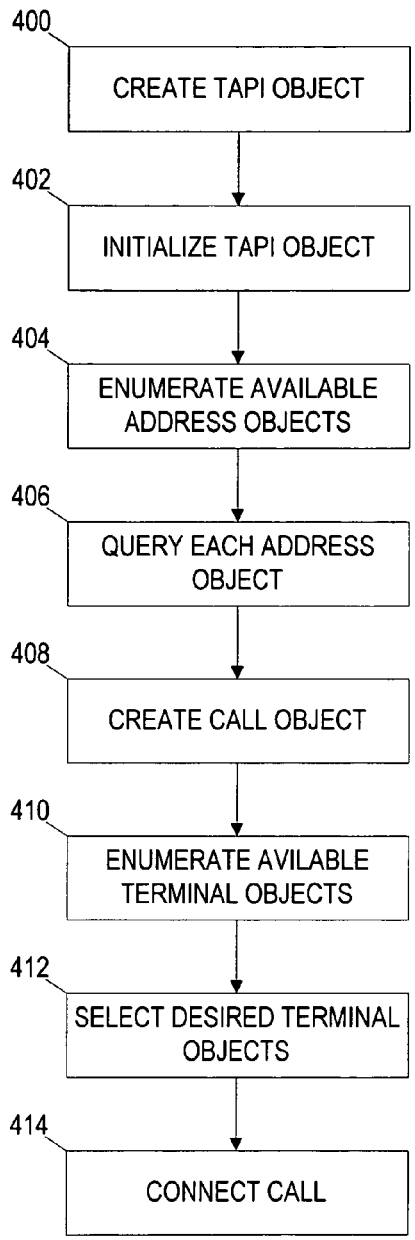
FIG. 4(a) shows a method for placing an outgoing computer telephony call according to one aspect of the present invention.

FIG. 4(*a*) shows a method for placing an outgoing computer telephony call according to an embodiment of the invention. FIG. 4(*b*) shows a method for receiving an incoming computer telephony call according to an embodiment of the invention. In this section of the detailed description, exemplary methods according to embodiments of the invention are presented. This description is provided in reference to FIGS. 4(*a*) through 4(*b*). These exemplary methods are desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Thus, in one embodiment, a computer program is executed by a processor of a computer from a medium therefrom, where the program may include address objects, call objects, terminal objects, and call-hub objects, as described in the previous section of the detailed description. Each of these objects may in one embodiment also correspond to a specific means for performing the functionality of the object. In another embodiment, the computer program also includes a terminal manager, which detects a plurality of multimedia devices and instantiates a terminal object for each multimedia device detected, as has also been described in the previous section of the detailed description.

Exemplary Methods

Referring now to FIG. 4(*a*), a flowchart of a method for placing an outgoing computer telephony call, according to an embodiment of the invention, is shown. In 400, a TAPI object is instantiated by an application program so that the program is able to use the functionality provided by the TAPI. In 402, the TAPI object is initialized. For example, a terminal manager is run to instantiate terminal objects for physical and virtual multimedia devices, as has been described in the previous section of the detailed description.

In 404, the TAPI object is queried for an enumeration of the address objects available from the TAPI object. Each address object has certain telephony capabilities—for example, one may relate to an ISDN line, another to a PSTN line, etc. Thus, in 406, each address object is queried to learn its telephony capabilities. The desired address object or objects are then selected, depending on the type of call desired (e.g., a regular voice call may go over a PSTN line, a video call may go over one or more ISDN lines, etc.).

In 408, a call object is instantiated from a desired address object or objects. The call object thus relates to the computer performing the method of FIG. 4(*a*) as being the caller for a specific computer telephony call utilizing the desired address object or objects. In 410, the desired address object or objects are queried for an enumeration of the terminal objects available from the address object or objects. For example, an address object relating to a PSTN line over which voice calls are placed may have a terminal object relating to a microphone and a terminal object relating to a sound card connected to a speaker. Depending on the type of call desired, then, in 412 at least one desired terminal object enumerated in 410 is selected. Finally, in 414, the outgoing computer telephony call is connected (i.e., placed) over the desired address object or objects utilizing the desired terminal object or objects.

Thus, placing a computer telephony call according to the embodiment of the invention of FIG. 4(*a*) involves determining the address objects that are available such that a call may be placed over them, and selecting a desired address object or objects. A call object is created for the specific call to be placed. The terminal objects that are available for the utilized address objects are then determined, and the desired terminal objects are selected. The call is then placed, such that the address objects represent the communication media over which the call is placed, and the terminal objects represent the multimedia devices that act as end points for the media stream communicated over the communication media.

Referring next to FIG. 4(*b*), a flowchart of a method for receiving an incoming computer telephony call, according to an embodiment of the invention, is shown. In 450, a TAPI object is instantiated by an application program so that the program is able to use the functionality provided by the TAPI. In 452, the TAPI object is initialized. For example, a terminal manager is run to instantiate terminal objects for physical and virtual multimedia devices, as has been described in the previous section of the detailed description.

In 454, the TAPI object is queried for an enumeration of the address objects available from the TAPI object. Each address object has certain telephony capabilities—for example, one may relate to an ISDN line, another to a PSTN line, etc. Thus, in 456, each address object is queried to learn its telephony capabilities. The desired address object or objects are then selected, depending on the type of call that is desired to be listened for (e.g., a regular voice call may be received over a PSTN line, a video call may be received over one or more ISDN lines, etc.).

Figure 4B:
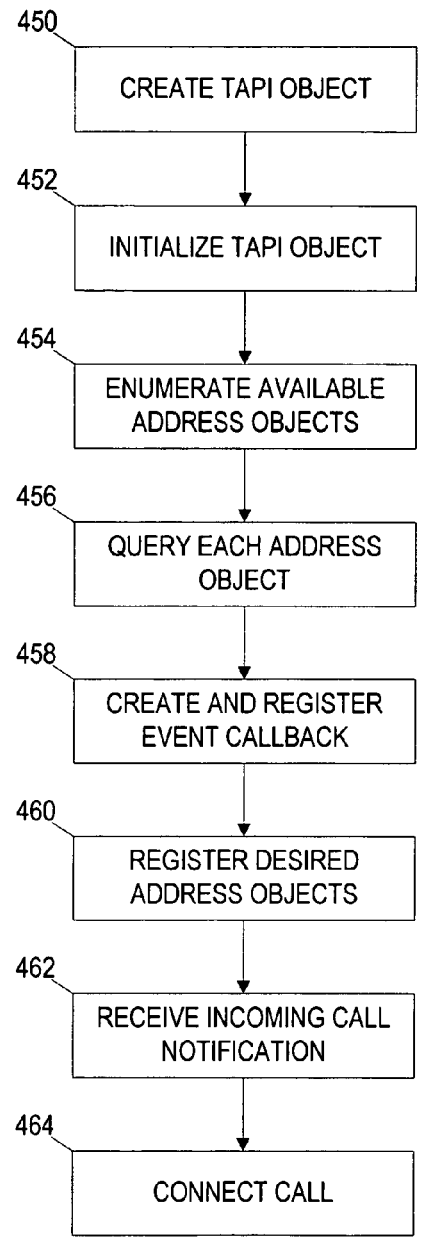
FIG. 4(b) shows a method for receiving an incoming computer telephony call according to one aspect of the present invention.

In 458, an event callback is instantiated and registered on the TAPI object. The event callback is a request by the application program performing the method of FIG. 4(b) to have the TAPI object notify the application program when the desired event occurs—in this case, when an incoming call is received. In 460, the desired address object or objects are also registered with the TAPI object. These are the address object or objects over which an incoming computer telephony call is to be listen for by the TAPI object, such that upon occurrence of such an event, the application program performing the method of FIG. 4(b) is notified. Thus, in 462, a notification of an incoming computer telephony call from the TAPI object is received on the event callback. In 464, the incoming computer telephony call is connected (i.e., received) over the desired address object or objects.

As has been described, receiving a computer telephony call according to the embodiment of the invention of FIG. 4(b) involves determining the address objects that are available such that a call may be received over them, and selecting a desired address object or objects. An event callback is created and registered, so that notification is received when a call arrives over the desired address object or objects. The call is then received (created), such that the address objects represent the communication media over which the call is received.

Speech Processing

Figure 5:
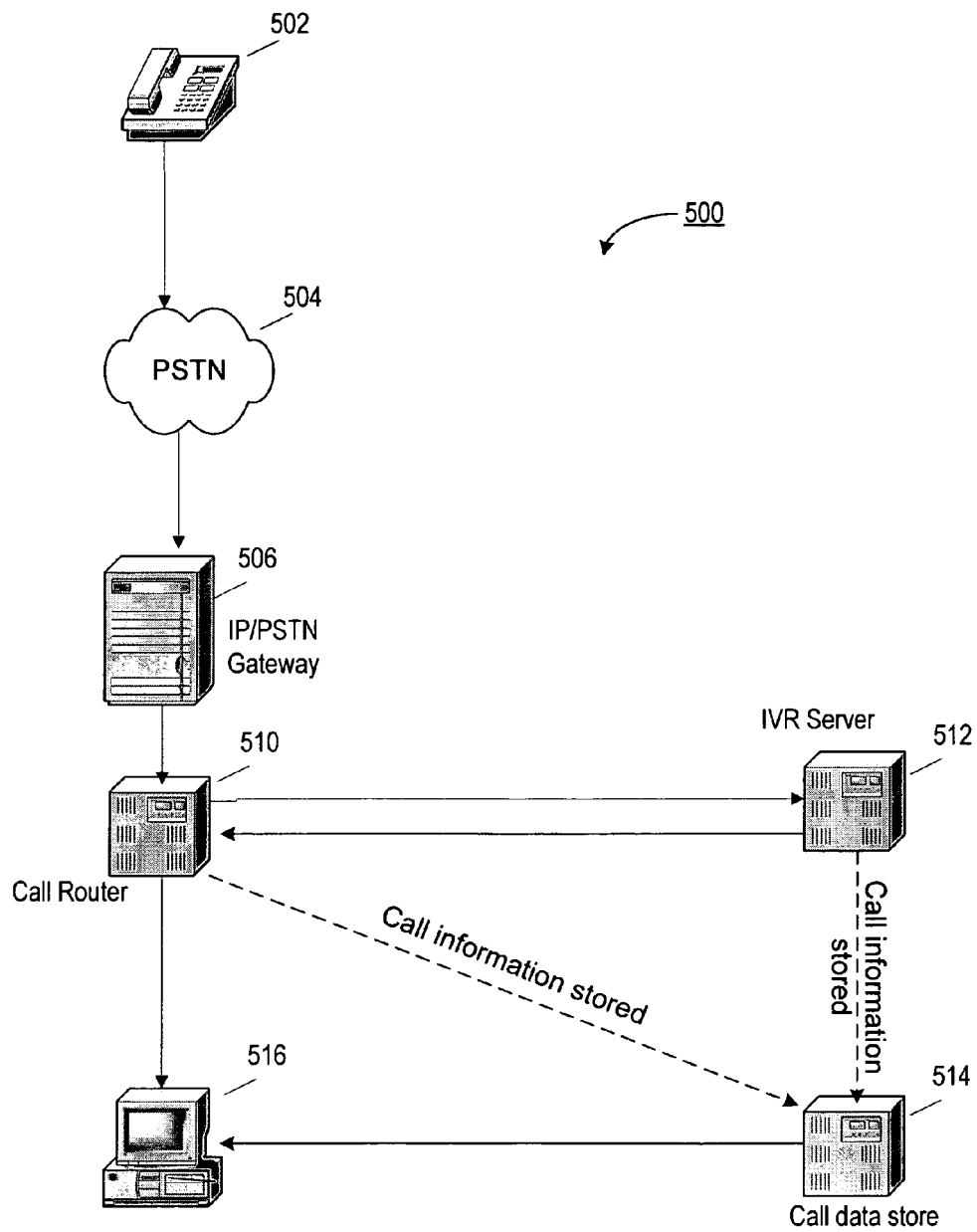
FIG. 5 is a block diagram of a system according to one aspect of the present invention.

FIG. 5 is a block diagram of a system according to one aspect of the present invention. A system 500 is an interactive voice response system that is used to collect and provide information for a caller. When a caller calls the system 500, the call is answered automatically. The system 500 presents the caller with a number of choices that the caller can select by pressing the keypad of the caller's telephone or by voice. If the system 500 determines that it is necessary for the caller to communicate to a human agent, the call is then routed to the client computer of the human agent so that the human agent can answer.

The system 500 includes a telephony source 502. The telephony source 502 generates a telephony call that is transmitted by a public switched telephone network 504. The public switched telephone network 504 transmits the telephony call to a gateway 506. The gateway 506 translates the telephony call based on the communication protocols of the public switched telephone network 504 to a telephony call based on internet protocols. The gateway 506 transmits the internet protocol telephony call to a call router 510. The call router 510 may store information associated with the internet protocol telephony call in a data store 514.

The call router 510 routes the internet protocol telephony call to an interactive voice response server 512. In one embodiment, the interactive voice response server 512 includes a terminal object. In another embodiment, the interactive voice response server 512 performs media processing tasks, such as playing prerecorded messages and detecting input from the user. In one embodiment, such media processing tasks can be accomplished using an appropriate instantiation of the terminal object. The interactive voice response server 512 may store information associated with the internet protocol telephony call in the data store 514. The interactive voice response server 512 decides to allow the call router 510 to route the internet telephony call to a client computer 516 depending on a caller's interaction with the interactive voice response server 512.

The client computer 516 is adapted to retrieve information associated with the internet protocol telephony call from the data store 514. In one embodiment, the client computer 516 includes a terminal object. The terminal object allows the client computer to answer the internet protocol telephony call.

Figure 6:
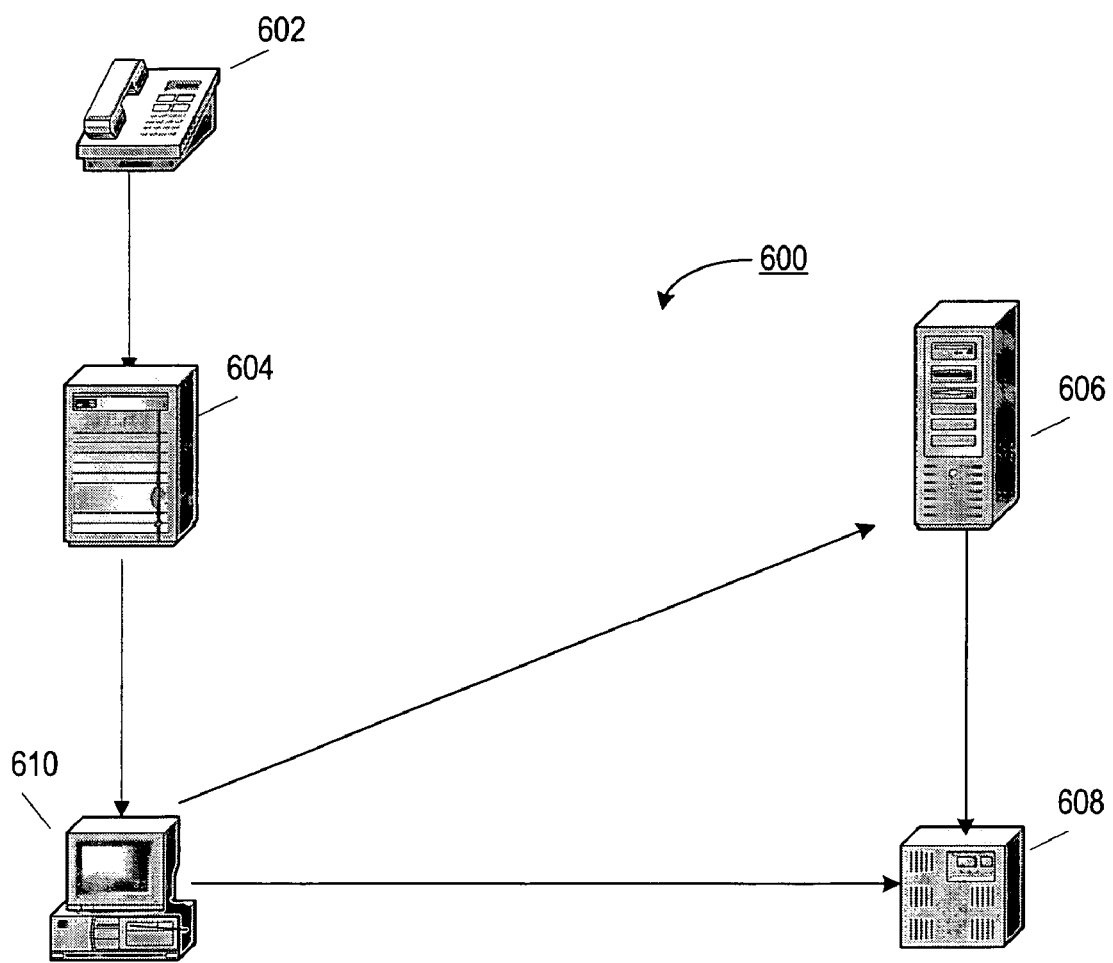
FIG. 6 is a block diagram of a system according to one aspect of the present invention.

FIG. 6 is a block diagram of a system according to one aspect of the present invention. A system 600 is a unified messaging system that allows voice mail to be saved as a computer file so that the voice mail can be accessed through an email system.

The system 600 includes a telephony source 602. The telephony source 602 generates a telephony call that is transmitted to a gateway 604. The gateway 604 translates the telephony call to a telephony call based on internet protocols. The gateway 604 transmits the internet protocol telephony call to a client computer 610. If the client computer 610 is unavailable to answer the internet protocol telephony call, the internet protocol telephony call is routed to a voice mail system 606. In one embodiment, the voice mail system 606 includes a terminal object.

The voice mail system 606 saves the voice mail in the email store. The client computer 610 receives an email message with the voice mail saved as an attachment. The client computer 610 may then access the voice mail through the media processing capability of the client computer 610.

Figure 7:
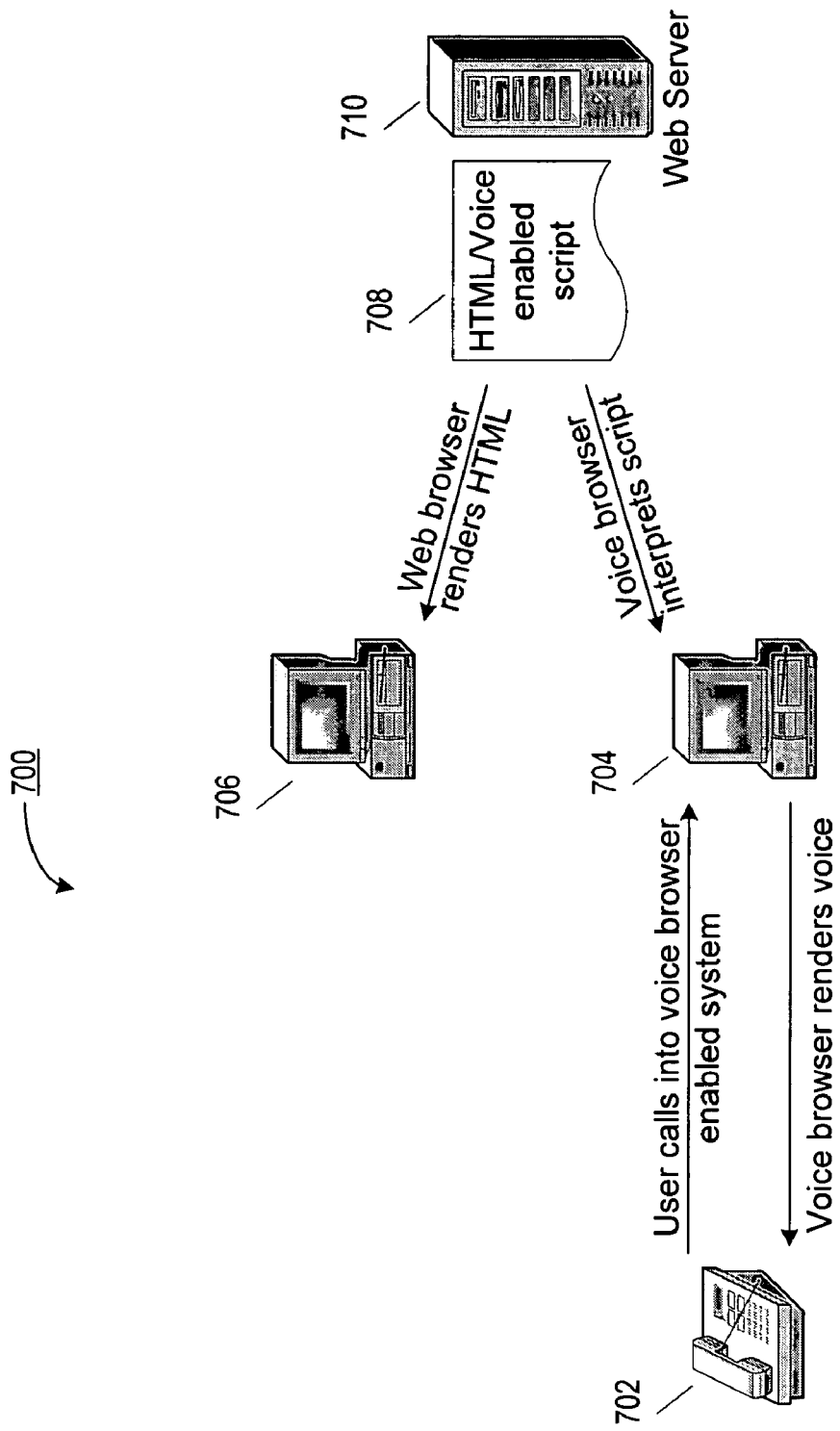
FIG. 7 is a block diagram of a system according to one aspect of the present invention.

FIG. 7 is a block diagram of a system according to one aspect of the present invention. A system 700 illustrates speech-enabled Web applications. The system 700 allows Web content and services to be accessed through telephony connections and rendered as speech rather than as text or graphics.

The system 700 includes a client 702. The client 702 initiates a telephony call to a voice browser 704 that is executing on a computer. The voice browser 704 can access at least one Web page 708 stored on a Web server 710. The Web page 708 may include voice tags. In one embodiment, the voice browser 704 includes a terminal object that can interpret the voice tags. In another embodiment, the terminal object renders the Web page 708 into speech for the client 702. In another embodiment, the terminal object allows the client to navigate through a Web site based on the speech commands of the client.

Figure 8:
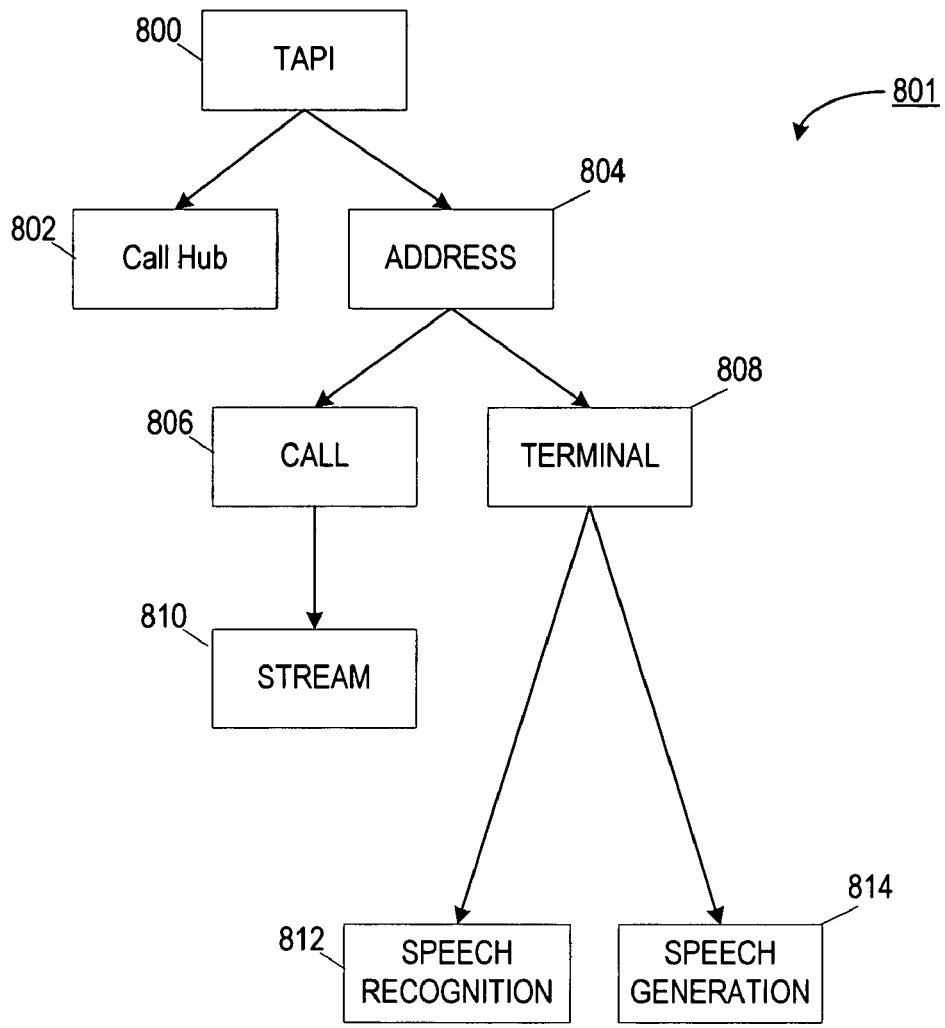
FIG. 8 is an object diagram of a collection of objects according to one aspect of the present invention.

FIG. 8 is an object diagram of a collection of objects according to one aspect of the present invention. An object hierarchy 801 includes objects that are similar to objects discussed hereinbefore. For clarity purposes, discussion relating to those similar objects is incorporated in full here.

The object hierarchy 801 includes a TAPI object 800, a call-hub object 802, an address object 804, a call object 806, a terminal object 808, and a stream object 810. These objects have been discussed hereinbefore. The object hierarchy 801 includes a speech recognition object 812 that is derived from the terminal object 808. In one embodiment, the terminal object 808 can be viewed as a terminal data structure, and the speech recognition object 812 is a speech recognition data structure that extends the terminal data structure. The object hierarchy 801 also includes a speech generation object 814 that is derived from the terminal object 808. In one embodiment, the terminal object 808 can be viewed as a terminal data structure, and the speech recognition object 814 is a speech recognition data structure that extends the terminal data structure.

Figure 9:
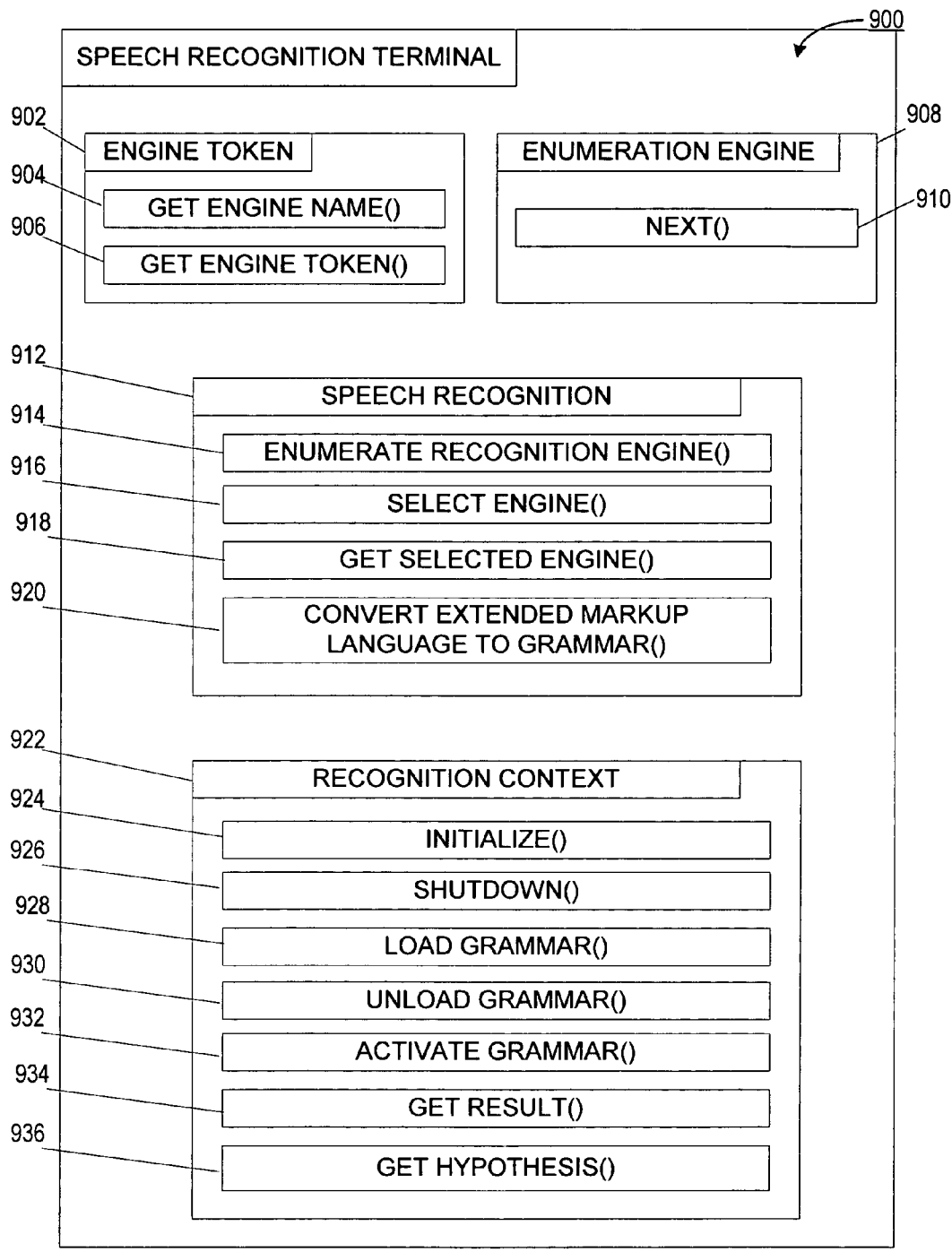
FIG. 9 is a structural diagram of a data structure according to one aspect of the present invention.

FIG. 9 is a structural diagram of a data structure according to one aspect of the present invention. A data structure 900 supports speech recognition. The data structure 900 includes a number of data structures to help the process of speech recognition. These data structures include an engine token data structure 902, an enumeration engine data structure 908, a speech recognition data structure 912, and a recognition context data structure 922.

The engine token data structure 902 includes a method member get engine name 904. The method member get engine name 904 gets the name of a speech recognition engine in a textual form. The engine token data structure 902 includes a method member get engine token 906. The method member get engine token 906 gets an identifier that identifies a speech recognition engine.

The enumeration engine data structure 908 includes a method member next 910. The method member next 910 gets the next available speech recognition engine from a list of available speech recognition engines.

The speech recognition data structure 912 includes a method member enumerate recognition engines 914. The method member enumerate recognition engines 914 obtains an indirect reference to a listing of speech recognition engines that are available for use. The speech recognition data structure 912 includes a method member select engine 916. The method member select engine 916 selects a speech recognition engine to be used in the speech recognition process. The speech recognition data structure 912 includes a method member get selected engine 918. The method member get selected engine 918 retrieves the currently selected speech recognition engine. The speech recognition data structure 912 includes a method member convert extended markup language to grammar 920 converts extended markup language (XML) into a compiled grammar for use with a speech recognition engine.

The recognition context 922 includes a method member initialize 924. The method member initialize 924 creates a speech recognition context based on a selected speech recognition engine. The recognition context 922 includes a method member shut down 926. The method member shut down 926 destroys a speech recognition context. The recognition context 922 includes a method member load grammar 928. The method member load grammar 928 loads a grammar into a recognition context from a source selected from a group consisting of a resource, a memory, and a file. The recognition context 922 includes a method member unload grammar 930. The method member unload grammar 930 unloads a grammar previously loaded into a recognition context. The recognition context 922 includes a method member activate grammar 932. The method member activate grammar 932 activates a grammar to be used in a speech recognition engine. The recognition context 922 includes a method member get result 934. The method member get result 934 retrieves a speech recognition result. The recognition context 922 includes a method member get hypothesis 936. The method member get hypothesis 936 retrieves a speech recognition result that is deemed a likely speech recognition result.

Figure 10:
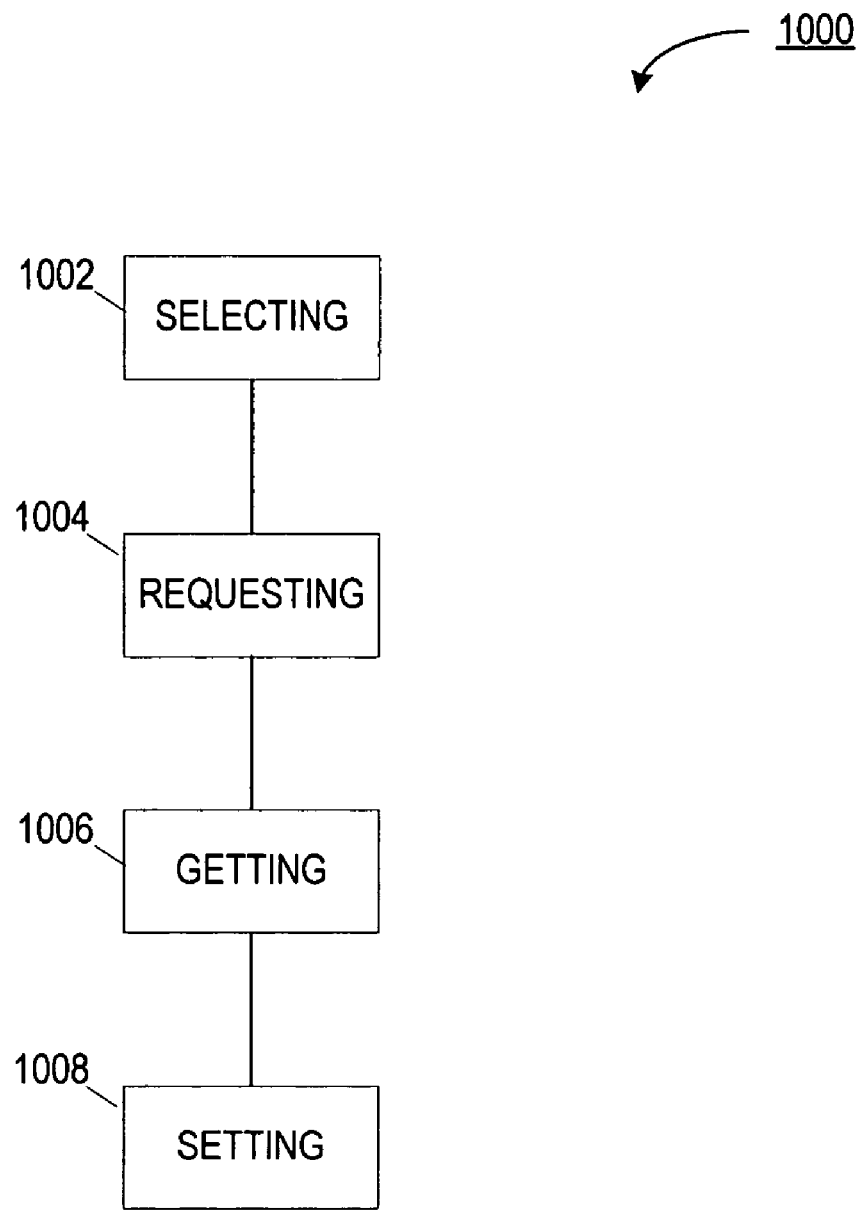
FIG. 10 is a process diagram of a method according to one aspect of the present invention.

FIG. 10 is a process diagram of a method according to one aspect of the present invention. A process 1000 is a method for enhancing media processing. The process 1000 includes an act 1002 for selecting a speech recognition terminal object. The process 1000 includes an act 1004 for requesting a speech recognition terminal object.

The process 1000 includes an act 1006 for getting a desired speech recognition engine. The act 1006 includes an act for enumerating a list of available speech recognition engines, an act for identifying a desired speech recognition engine from the list of available speech recognition engines, and an act for selecting the desired speech recognition engine.

The process 1000 includes an act 1008 for setting a speech recognition context. The act 1008 includes an act for initializing the speech recognition context, an act for loading a grammar for the speech recognition context, and an act for setting the speech recognition context to notify a user when a desired event occurs.

Figure 11:
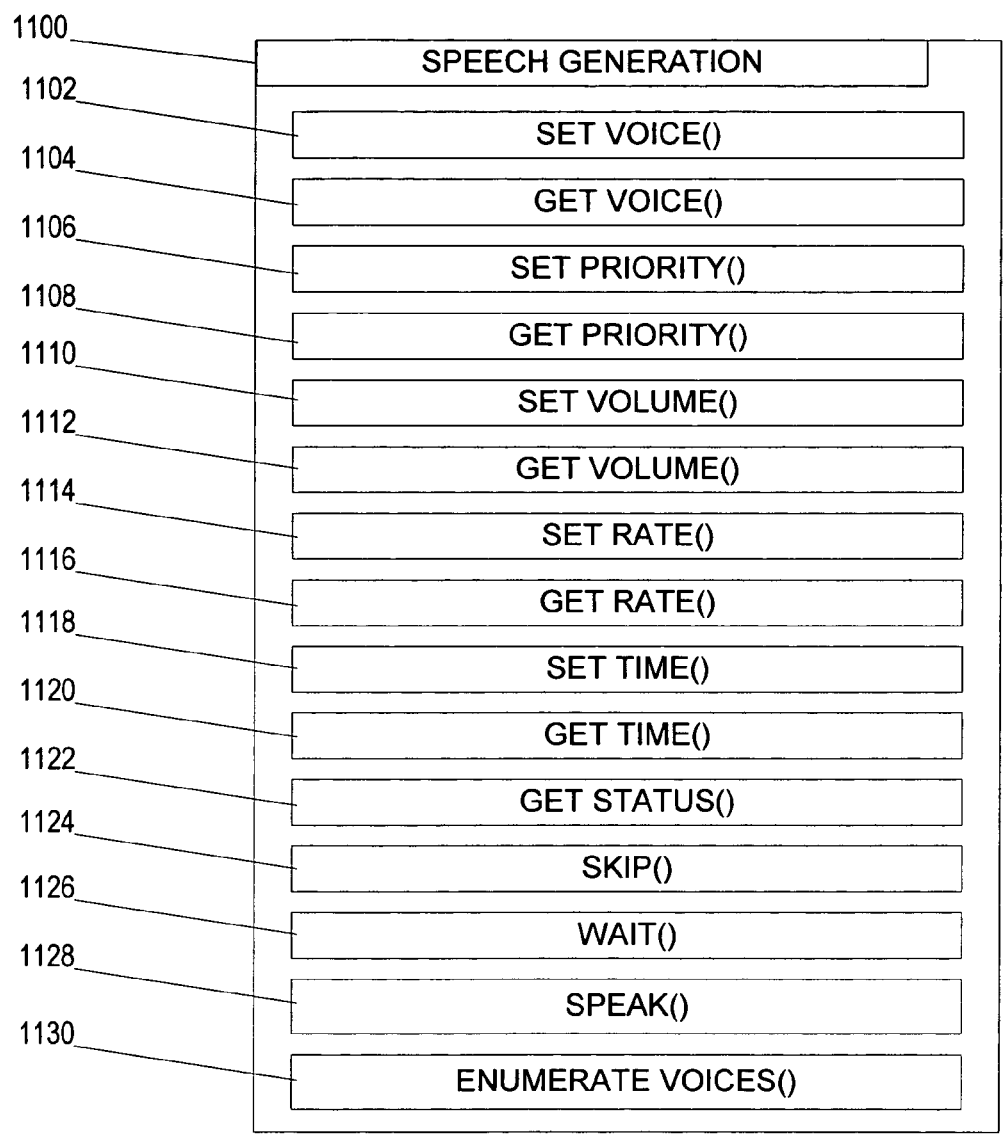
FIG. 11 is a structural diagram of a data structure according to one aspect of the present invention.

FIG. 11 is a structural diagram of a data structure according to one aspect of the present invention. A data structure 1100 supports speech generation. The data structure 1100 takes a text string and renders such a text string into speech. The data structure 1100 allows a voice to be selected to speak the rendered speech.

The data structure 1100 includes a set of voice method members that are selected from a group consisting of a method member set voice 1102 for setting a voice to be used for speech generation and a method member get voice 1104 for getting the voice used in speech generation. The data structure 1100 includes a set of priority method members that are selected from a group consisting of a method member set priority 1106 for setting a priority for a voice and a method member get priority 1108 for getting a priority for a voice. The voice with a higher priority may interrupt a voice with a lower priority. The data structure 1100 includes a set of volume method members that are selected from a group consisting of a method member set volume 1110 for setting a volume of speech synthesized by a speech engine and a method member get volume 1112 for getting a volume of speech synthesized by a speech generation engine. The data structure 1100 includes a set of rate method members that are selected from a group consisting of a method member set rate 1114 for setting a rate of speech synthesized by a speech generation engine and a method member get rate 1116 for getting a rate of speech synthesized by a speech generation engine. The data structure 1100 includes a set of time out method members that are selected from a group consisting of a method member set time 1118 for setting a time for a speech synthesis to time out and a method member get time 120 for getting a time for a speech synthesis to time out.

The data structure 1100 includes a method member speak 1128 for synthesizing text to audio. The data structure 1100 includes a method member get status 1122 for getting a status on synthesizing of output audio. The data structure 1100 includes a method member skip 1124 for skipping to a specific point in a text stream. The data structure 1100 includes a method member wait 1126 for blocking other executions until the method member speak 1128 has been executed to completion. The data structure 1100 includes a method member enumerate voices 1130 for obtaining a list of voices for the speech generation engine.

The method member speak 1128 is receptive to a number of inputs so as to enhance the synthesis of text to audio. These inputs include a text stream with voice markup, an offset that represents an offset into the text stream where the voice should start speaking, a speakover flag so as to blend the voice output over any currently playing audio output, and a punctuation flag so as to allow a speech generation engine to speak each punctuation of a text stream.

Figure 12:
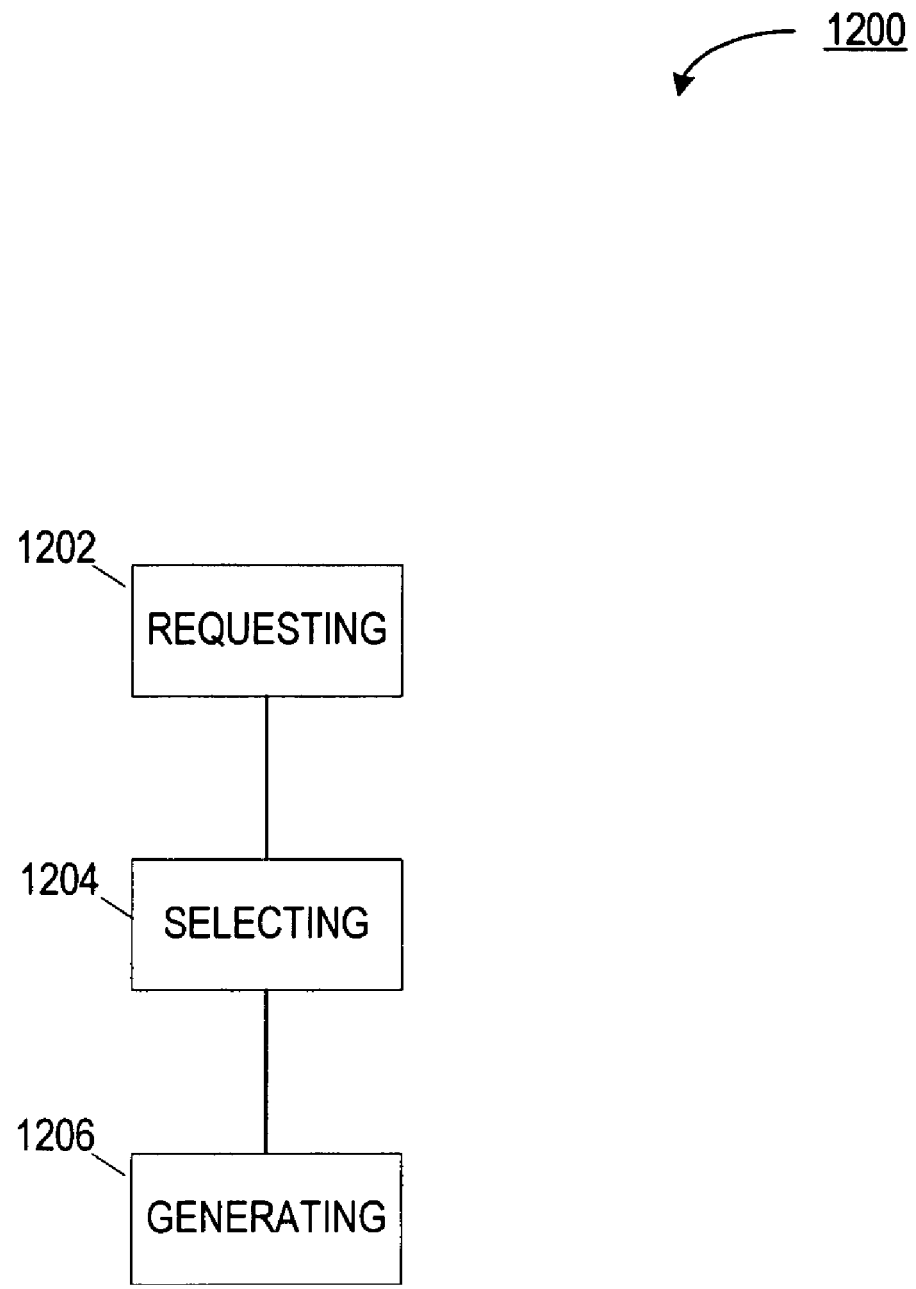
FIG. 12 is a process diagram of a method according to one aspect of the present invention.

FIG. 12 is a process diagram of a method according to one aspect of the present invention. A process 200 is a method for enhancing media processing. The process 200 allows speech generation. The process 200 includes an act 202 for requesting a speech generation terminal object. The process 200 includes an act 204 for selecting a voice. The act 204 includes an act for enumerating a list of available voices and an act for identifying a desired voice from the list of available voices. The process 200 includes an act 206 for generating a speech. In one embodiment, the act 206 generates the speech from a text stream that includes voice markup.

CONCLUSION

Computer telephony application programming interface has been described.

Although the specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

What is claimed is:

1. A computing device having a memory and a processor for enhancing media processing of a media stream containing speech data, comprising:
   a terminal data structure to support instantiating terminal objects, each terminal object adhering to a uniform interface, providing a telephony service, and having a terminal class name and a media type;
   a speech recognition terminal data structure that extends the terminal data structure;
   a terminal manager to instantiate, based on the terminal data structure and the speech recognition terminal data structure, terminal objects including a speech recognition terminal object to recognize speech having a speech recognition media type; and
   a TAPI application component providing a telephony API to form a connection with a client and to process the speech data by:
      registering terminal objects including a speech recognition terminal object;
      selecting, with the processor, the speech recognition terminal object from among a group of registered terminal objects based on the media type of the registered terminal objects;
      instantiating the selected speech recognition terminal object using the terminal manager by providing the terminal class name, the media type, and a method of signaling events; and
      providing the speech data to the instantiated speech recognition terminal object for recognition of the speech data.

2. The computing device of claim 1, wherein the speech recognition terminal data structure includes an engine token data structure.

3. The computing device of claim 1, wherein the speech recognition terminal data structure includes an enumeration engine data structure.

4. The computing device of claim 1, wherein the speech recognition terminal data structure includes a speech recognition data structure.

5. The computing device of claim 1, wherein the speech recognition terminal data structure includes a recognition context data structure.

6. A computer-readable storage medium containing computer-executable instructions that when executed by a computer having a memory and a processor cause the computer to perform a method for enhancing media processing, the method comprising:
   providing a terminal data structure to support instantiating terminal objects, each terminal object adhering to a uniform interface, providing a telephony service, and having a terminal class name and a media type;
   providing a speech recognition terminal data structure that extends the terminal data structure, wherein the speech recognition terminal data structure includes an engine token data structure; and
   using a telephony API provided by a TAPI application component to form a connection with a client and to process speech data by:
      registering terminal objects including a speech recognition terminal object;
      selecting, with the processor, the speech recognition terminal object from among a group of registered terminal objects based on the media type of the registered terminal objects;
      instantiating the selected speech recognition terminal object using a terminal manager, based on the terminal data structure and the speech recognition terminal data structure, by providing the terminal class name, the media type, and a method of signaling events; and
      providing speech data to the instantiated speech recognition terminal object for recognition of the speech data.

7. The computer-readable storage medium of claim 6, wherein the engine token data structure includes a method member get engine name for getting a name of a speech recognition engine in a textual form.

8. The computer-readable storage medium of claim 6, wherein the engine token data structure includes a method member get engine token for getting an identifier that identifies a speech recognition engine.

9. A computing system having a memory and a processor for enhancing media processing of speech, comprising:
   a terminal data structure to support instantiating terminal objects, each terminal object adhering to a uniform interface, providing a telephony service, and having a terminal class name and a media type;
   a speech recognition terminal data structure that extends the terminal data structure, wherein the speech recognition terminal data structure includes an enumeration engine data structure; and
   a TAPI application component providing a telephony API to form a connection with a client in response to receiving a call from the client and to process the speech by:
      registering terminal objects including a speech recognition terminal object;
      selecting, with the processor, the speech recognition terminal object from among a group of registered terminal objects based on media type of the registered terminal objects;

instantiating the selected speech recognition terminal object using a terminal manager, bsed on the terminal data structure and the speech recognition terminal data structure, by providing the terminal class name, the media type, and a method of signaling events; and providing the speech to the instantiated speech recognition terminal object for recognition of the speech data.

10. The computing system of claim 9, wherein the enumeration engine data structure includes a method member next for getting a next available speech recognition engine.

11. A computing system having a memory and a processor for enhancing media processing, comprising:

a terminal data structure to support instantiating terminal objects, each terminal object adhering to a uniform interface, providing a telephony service, and having a terminal class name and a media type;

a speech recognition terminal data structure that extends the terminal data structure, wherein the speech recognition terminal data structure includes a speech recognition data structure; and a TAPI application component providing a telephony API to form a connection with a client in response to receiving a call from the client, and to process speech by:

registering terminal objects including a speech recognition terminal object;

selecting, with the processor, the speech recognition terminal object from among a group of registered terminal objects;

instantiating the selected speech recognition terminal object using a terminal manager, based on terminal data structure and the speech recognition terminal data structure, by providing the terminal class name, the media type, and a method of signaling events; and providing speech to the instantiated speech recognition terminal object for recognition of the speech.

12. The computing system of claim 11, wherein the speech recognition data structure includes a member method enumerate recognition engines for obtaining an indirect reference to a listing of speech recognition engines that are available for use.

13. The computing system of claim 11, wherein the speech recognition data structure includes a member method select engine for selecting a speech recognition engine to be used.

14. The computing system of claim 11, wherein the speech recognition data structure includes a member method get selected engine for retrieving the currently selected speech recognition engine.

15. The computing system of claim 11, wherein the speech recognition data structure includes a member method convert extended markup language to grammar for converting extended markup language text into a compiled grammar for use with a speech recognition engine.

16. A computer-readable storage medium containing computer-executable instructions that when executed by a computer having a memory and a processor cause the computer to perform a method for enhancing media processing of speech, the method comprising:

receiving a terminal data structure to support instantiating terminal objects, each terminal object adhering to a uniform interface, providing a telephony service, and having a terminal class name and a media type;

receiving a speech recognition terminal data structure that extends the terminal data structure, wherein the speech recognition terminal data structure includes a recognition context data structure; and providing by a TAPI application component a telephony API to form a connection with a client and to process the speech by:

registering terminal objects including a speech recognition terminal object;

selecting, with the processor, the speech recognition terminal object from among a group of registered terminal objects based on the media type of the registered terminal objects;

instantiating the selected speech recognition terminal object using a terminal manager, based on the terminal data structure and speech recognition terminal data structure, by providing the terminal class name, the media type, and a method of signaling events; and providing speech data to the instantiated speech recognition terminal object for recognition of the speech data.

17. The computer-readable storage medium of claim 16, wherein the recognition context data structure includes a method member initialize for creating a speech recognition context based on a selected speech recognition engine.

18. The computer-readable storage medium of claim 16, wherein the recognition context data structure includes a method member shut down for destroying a speech recognition context.

19. The computer-readable storage medium of claim 16, wherein the recognition context data structure includes a method member load grammar for loading a grammar into a recognition context from a source selected from a group consisting of a resource, a memory, and a file.

20. The computer-readable storage medium of claim 16, wherein the recognition context data structure includes a method member unload grammar for unloading a grammar previously loaded into a recognition context.

21. The computer-readable storage medium of claim 16, wherein the recognition context data structure includes a method member activate grammar for activating a grammar to be used in a speech recognition engine.

22. The computer-readable storage medium of claim 16, wherein the recognition context data structure includes a method member get result for retrieving a speech recognition result.

23. The computer-readable storage medium of claim 16, wherein the recognition context data structure includes a method member get hypothesis for retrieving a speech recognition result that is deemed a likely speech recognition result.

24. A method in a computing device having a memory and a processor for enhancing media processing, comprising:

providing terminal objects adhering to a uniform interface, providing telephony services, and having terminal class names and media types, the terminal objects including a speech recognition terminal object for recognizing speech;

with a processor, invoking a telephony API to listen for incoming calls, wherein the telephony API is provided by a TAPI application component, the TAPI application component for:

registering terminal objects that are selectable for instantiation with a terminal manager by providing a terminal class name, a media type, and a method of signaling events and providing a list of registered terminal objects including the media types of the registered terminal objects;

upon receiving a call from a client, with the processor, invoking the telephony API to form a connection with the client and to select the speech recognition terminal object from among a group of registered terminal objects;

with a processor, invoking a method of the selected speech recognition terminal object to get a desired speech recognition engine; and setting a speech recognition context based on the desired speech recognition terminal object to recognize speech associated with the received call.

25. The method of claim 24, further comprising:
enumerating a list of available speech recognition engines.

26. The method of claim 25, further comprising:
identifying a desired speech recognition engine from the list of available speech recognition engines.

27. The method of claim 26, further comprising:
selecting the desired speech recognition engine.

28. The method of claim 24, wherein setting includes initializing the speech recognition context.

29. The method of claim 24, wherein setting includes loading a grammar for the speech recognition context.

30. The method of claim 24, wherein setting includes activating a grammar for the speech recognition context.

31. The method of claim 24, wherein setting includes setting the speech recognition context to notify a user when a desired event occurs.

32. A system for enhancing processing of speech of a media stream, comprising:

a processor;

a speech terminal object to recognize the speech of the media stream; and a TAPI application component providing a telephony API to form a connection with a client and to process the speech of the media stream by:

registering terminal objects including the speech terminal object, each terminal object adhering to a uniform interface;

selecting the speech terminal object from among a group of registered terminal objects;

instantiating the selected speech terminal object using the terminal manager by providing the terminal class name, the media type, and a method of signaling events; and providing speech of the media stream to the instantiated speech terminal object for recognition of the speech of the media stream wherein the speech terminal object includes computer-executable instructions stored in a memory for execution by the processor.

33. The method of claim 24, further comprising:
invoking a method of the speech recognition context to retrieve a speech recognition result.

* * * * *

UNITED STATES PATENT AND TRADEMARK OFFICE
CERTIFICATE OF CORRECTION

PATENT NO. : 7,634,066 B2 Page 1 of 1
APPLICATION NO. : 10/882703
DATED : December 15, 2009
INVENTOR(S) : Mary Michelle Quinton It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1489 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,634,066 B2 | |
| APPLICATION NO. | : 10/882703 | |
| DATED | : December 15, 2009 | |
| INVENTOR(S) | : Mary Michelle Quinton | |

It is certified that error appears in the above-identified patent and that said Letters Patent is hereby corrected as shown below:

In column 1, line 5, delete "2000" and insert -- 2000, --, therefor.

Signed and Sealed this
Fifteenth Day of February, 2011

David J. Kappos
*Director of the United States Patent and Trademark Office*